(12) United States Patent
Duez et al.

(10) Patent No.: US 7,118,618 B2
(45) Date of Patent: Oct. 10, 2006

(54) COLORED LIQUID COMPOSITION FOR EDITING PEN

(75) Inventors: José Duez, Feldkirch (FR); Carine Bethouart, Feldkirch (FR)

(73) Assignee: Conte, Boulogne sur Mer Cedex (FR)

( * ) Notice: Subject to any disclaimer, the term of this patent is extended or adjusted under 35 U.S.C. 154(b) by 232 days.

(21) Appl. No.: 10/250,351

(22) PCT Filed: Dec. 20, 2001

(86) PCT No.: PCT/FR01/04131

§ 371 (c)(1), (2), (4) Date: Oct. 29, 2003

(87) PCT Pub. No.: WO02/051950

PCT Pub. Date: Jul. 4, 2002

(65) Prior Publication Data

US 2004/0065226 A1    Apr. 8, 2004

(51) Int. Cl.
    *C09D 11/00*    (2006.01)
(52) U.S. Cl. .............. 106/31.58; 106/31.86; 106/31.32; 106/31.64; 106/31.41
(58) Field of Classification Search ............ 106/31.13, 106/31.32, 31.64, 31.58, 31.86, 31.41
    See application file for complete search history.

(56) References Cited

U.S. PATENT DOCUMENTS

| | | | |
|---|---|---|---|
| 5,174,814 A | | 12/1992 | Burwell et al. |
| 5,232,494 A | | 8/1993 | Miller |
| 5,441,561 A | * | 8/1995 | Chujo et al. .............. 106/31.28 |
| 5,498,282 A | * | 3/1996 | Miller et al. ................. 524/423 |
| 5,865,883 A | * | 2/1999 | Teraoka et al. ........... 106/31.32 |

FOREIGN PATENT DOCUMENTS

| | | |
|---|---|---|
| EP | 0 464 304 | 1/1992 |
| FR | 2 476 668 | 8/1981 |

OTHER PUBLICATIONS

Machine Translation of JP 06-073324,3-1994.*
Written Opinion (English-language) for PCT/FR01/04131 (corresponding to Written Opinion (French-language) for PCT/FR01/04131 filed on Jun. 20, 2003).

* cited by examiner

*Primary Examiner*—J. A. Lorengo
*Assistant Examiner*—Veronica F. Faison
(74) *Attorney, Agent, or Firm*—Jones Day

(57) ABSTRACT

The colored liquid composition of the invention for a highlighter comprises a coloring element and water, the water content by weight lies in the range 10% to 30%. In addition, it comprises at least 40% of a liquid component having surface tension greater than 40 mN/m. In a variant, the coloring element is a tracer solvent having a fluorescent appearance under basic pH, in particular hydroxypyrenetrisulfonic acid, the pH of the composition lying in the range 8 to 9, and the component having surface tension greater than 40 mN/m is triethanolamine. Under such circumstances, the composition contains an acid to neutralize the triethanolamine in part in order to obtain the basic pH, for example hydrochloric acid.

16 Claims, No Drawings

COLORED LIQUID COMPOSITION FOR EDITING PEN

This application is a national stage filing of International Application No. PCT/FR01/04131, filed Dec. 20, 2001, which claims priority to French Patent Application No. 00/16946 filed Dec. 22, 2000, the entire contents of which applications are incorporated in their entirety herein by reference.

The present invention relates to a colored liquid composition for a writing instrument for highlighting or marking the colored liquid composition is suitable for use in a text that has already been written to draw attention optically to the passage of said text that has been highlighted.

BACKGROUND OF THE INVENTION

Three types of colored liquid compostions or inks are already known for highlighting pens that serve to highlight text or make it stand out optically.

In the first type, the ink is a traditional colored ink in which the dye(s) is/are at low concentration so as to avoid masking the text which is to be highlighted. Generally such an ink is based on a solvent containing about 70% water and 30% diethylene glycol.

In the second type, concentrated ink is used containing 50% water and 50% fluorescent dye coated in resins that are put into emulsion in water. The concentrated ink is used for making the colored liquid composition for use in the highlighter at a concentration of 20% to 30% by weight, with the reminder of the composition being constituted by a water-retaining agent such as glycerin, sorbitol, diethylene glycol, or triethylene glycol which avoids the tip of the writing instrument drying out too quickly.

In the third type, the colored liquid composition makes use of water-soluble fluorescent dyes and requires the physico-chemical characteristics of the composition to be adapted to obtain a compromise between the fluorescent effect and the properties of the writing instrument in use. By way of example, a colored liquid composition of this type is disclosed in document EP 0 464 304, which composition is based on an aqueous solution of hydroxy-pyrenetrisulfonic acid with basic pH. Such a composition contains 5% to 20% by weight compared with the total weight of liquid of mono-, di-, or trisaccharides obtained by reducing the polyols from which they are derived or by mixing said substances.

Colored liquid compositions for highlighters, in all three of the above-specified types, present the same defect when highlighting text that was previously written using a fountain pen or a roller (ball felt tip) having an ink formulation based on water-soluble dyes. Under such circumstances, it is found that the colored liquid composition of the highlighter moistens the ink of the text and partially dissolves the dyes contained in said ink. As a result the dyes constituting the written text become smeared in the highlighted passages, giving a particularly unpleasing appearance. Furthermore, the tip of the highlighter is also polluted to some extent by the dyes that it has partially dissolved from the ink of the written text.

OBJECT AND SUMMARY OF THE INVENTION

The object of the invention is to mitigate the above-mentioned drawbacks.

This object is well achieved by the colored liquid composition for a highlighting pen which, in known manner, comprises water and a coloring element. In characteristic manner, the colored liquid composition contains a water content by weight of 10% to 30% and a content by weight of at least 40% of a liquid component having surface tension greater than 40 millinewtons per meter (mN/m).

The presence of a small amount of water makes it possible to use coloring elements that are water-soluble while nevertheless not enabling the dyes contained in the writing ink for highlighting to be dissolved. The content of the liquid component having a surface tension in excess of 40 mM/m prevents the colored liquid composition from penetrating into the writing medium, when the medium is paper.

In a preferred embodiment, the coloring element is a tracer solvent whose fluorescent appearance is revealed at basic pH, such as hydroxypyrenetrisulfonic acid (pyranine, color index solvent green 7 No. 59040) with pH lying in the range 8 to 9. Under such circumstances, the component having surface tension greater than 40 mN/m is triethanolamine, which has been partially neutralized by an acid, in particular hydrochloric acid so as to obtain the basic pH lying in the range 8 to 9. This neutralization makes it possible to enrich the color liquid composition with a quaternary ammonium salt which limits penetration of the composition into the writing medium when the medium is paper. In addition, it has been found that if this hydrochloric acid neutralization is not performed, then the colored liquid composition presents viscosity that is too high to allow the ink to diffuse normally in the capillary lattice of the writing instrument, because of the large content of triethanol-amine. This neutralization serves to lower viscosity under conditions that enable the instrument to operate normally.

The viscosity adjustment required for normal operation of the instrument can also be achieved by a certain amount of primary alcohol, lying in the range 1% to 20% by weight. The alcohol may be ethyl, propyl, or butyl, for example.

In addition, limiting the penetration of the colored liquid composition into the paper medium can be further adjusted by using an acrylic resin in emulsion in the composition, at a concentration of about 2% to 15% by weight.

Naturally, it is possible to use other types of coloring element, in particular a water-soluble fluorescent dye such as acid blue No. 9, for example.

Furthermore, it is appropriate on a case-by-case basis to select the liquid component whose surface tension is greater than 40 mN/in, e.g. from the group consisting of ethanolamine, triethanolamine, glycerin (or glycerol), sorbitol, and glycols.

The preferred liquid component is the reaction product of glycerin (or glycerol) and urea, giving the following developed formula:

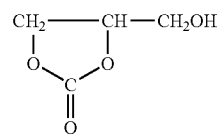

Its surface tension is about 64.5 mN/in and its viscosity is about 150 centipoises (cPo). A larger quantity, therefore, can be incorporated, about 80%, with a corresponding reduction in the quantity of water, about 10% in the colored liquid composition for highlighting, compared with other components that are more viscous, such as glycerin.

DETAILED DESCRIPTION OF THE INVENTION

The present invention will be better understood on reading the following description of embodiments of a colored liquid composition for highlighting based on hydroxypyrenetrisulfonic acid in an alkaline solution.

Document EP 0 464 304 discloses a colored liquid composition suitable for use in writing instruments of the highlighter or marker type, which is based on an aqueous solution presenting a pH situated in the alkaline range, hydroxypyrenetrisulfonic acid known under the name pyranine, referenced color index solvent green 7 No. 59040. In that document, the colored liquid composition contains 5% to 20% by weight relative to the total weight of liquid of mono-, di-, or trisaccharides coming from the reduction of the polyols from which they derive, or of a mixture of said substances. According to that document, such addition of mono-, di-, or trisaccharides makes it possible to obtain overlining of exceptional quality on the widest variety of types of paper with very great improvement in the fastness of the marking in relation to light.

However, according to the Applicant, when the highlighting is performed on text written with a fountain pen or with a roller, using ink formulated on the basis of water-soluble dyes, the dyes in the passage being highlighted are smeared, and the tip of the highlighter is also polluted to some extent with said dyes.

The colored liquid composition whose formula by weight is given below serves to avoid those drawbacks. This composition is likewise based on pyranine in an alkaline solution.

Pyranine (color index solvent green 7 No. 59040): 1% to 3%

Triethanolamine 85% (neutralized with 22 moles concentrated hydrochloric acid): 42.5% to 70%

Water: 10% to 30%

Acrylic styrene resin emulsion with 50% water: 2% to 15%

Primary alcohol: 1% to 20%

Triethanolamine has surface tension of 47.5 mN/m. Adding concentrated hydrochloric acid serves to neutralize the triethanolamine in part so as to reach a pH in the range 8 to 9, which is necessary for revealing the intense fluorescent yellow effect of pyranine. The acrylic styrene resin in emulsion may be constituted, for example, by the product sold under the reference Joncryl J90 by the firm Goodrich.

The primary alcohol is preferably ethyl alcohol, propyl alcohol, or indeed butyl alcohol.

The purpose of adding the primary alcohol is to reduce the viscosity of the colored liquid composition without significantly reducing its surface tension which needs to be maintained high enough to prevent the composition from passing through the paper medium, which would have the effect of spoiling the reverse side of the sheet on which the highlighter is used.

The particular feature of the colored liquid composition of the invention is that it satisfies all of the following requirements:

it reveals the fluorescent character of pyranine by the alkaline pH of the composition;

it enables the pyranine to be dissolved because of the presence of water;

its viscosity is low enough to enable the composition to diffuse in normal manner in writing instrument, by capillarity;

its surface tension is high enough to limit penetration of the composition into a paper medium; and it has a quantity of water that is small so as to avoid entraining water-soluble dyes from the ink in the passage being highlighted.

All of those requirements are satisfied by the colored liquid composition whose formulation by weight is given above. Nevertheless, the present invention is not limited to that particular implementation which uses pyranine as the coloring element and triethanolamine as the component having surface tension greater than 40 mN/m. Other types of coloring element can be used, in particular water-soluble fluorescent dyes which do not need to have a basic pH.

Whatever the coloring element used, it is possible to use other liquid components having surface tension greater than 40 mN/n, e.g. glycerin (or glycerol), sorbitol, or glycols.

The surface tension of glycerin is about 72 mN/m, but its viscosity is very high, being about 1200 cPo. It is suitable, but it requires a water content that is rather high, about 25%.

A preferred component is $C_4H_6O_4$ which is the result of reacting glycerin with urea and which has the following developed formula:

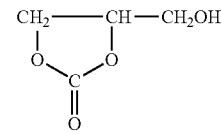

This has a surface tension of about 64.5 mN/m, but its viscosity is about 150 cPo. This makes it possible to use a minimum water content of 10%.

In the two examples below, A and B are liquid compositions having similar formulations, using glycerin (A) or the component $C_4H_6O_4$ (B).

|  | (A) | (B) |
| --- | --- | --- |
| pyramine | 3% | 3% |
| glycerin | 64.75% | 0 |
| $C_4H_6O_4$ component | 0 | 80.5% |
| water | 25% | 10% |
| neutralized triethanolamine | 0.55% | 2.5% |
| n. propanol | 4% | 4% |

It should be observed that the viscosity value needed for normal operation of the instrument is a function of the elements constituting the instrument, such as its writing head, its capillary connector, the fibers and the bonding agents making up the fiber reservoir. It is thus possible to select said elements to take account of the viscosity of the colored liquid composition, or conversely to select said composition as a function of the instrument. By way of non-inclusive indication, the viscosity of the colored liquid composition for normal operation of a highlighting instrument may lie in the range 10 cPo to 30 cPo.

The invention claimed is:

1. A colored liquid composition for highlighting, the composition comprising water and a coloring element, wherein the water content by weight lies in the range 10% to 30% and wherein the composition comprises at least 40% of a liquid component having surface tension greater than 40 mN/m, wherein the liquid component having surface tension greater than 40 mN/m is a $C_4H_6O_4$ component of formula:

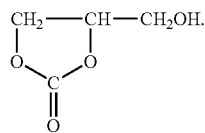

2. A colored liquid composition for highlighting, the composition comprising water and a coloring element, wherein the water content by weight lies in the range 10% to 30% and wherein the composition comprises at least 40% of a liquid component having surface tension greater than 40 mN/m, wherein the liquid component having surface tension greater than 40 mN/m is a $C_4H_6O_4$ component of formula:

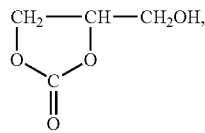

and wherein the water content is about 10% and the $C_4H_6O_4$ component content is about 80%.

3. The composition according to claim 1, wherein the coloring element is a tracer solvent having a fluorescent appearance under basic pH, wherein the pH of the composition lies in the range 8 to 9.

4. The composition according to claim 3, wherein the component having surface tension greater than 40 mN/m is triethanolamine, and wherein the composition further comprises an acid to neutralize in part the triethanolamine so as to obtain the basic pH.

5. The composition according to claim 1, further comprising a primary alcohol at a content in the range 1% to 20% by weight.

6. The composition according to claim 1, further comprising an acrylic resin in emulsion at a content of 2% to 15% by weight.

7. The composition according to claim 1, wherein the component having surface tension greater than 40 mN/m is selected from the group consisting of glycerin, sorbitol, glycols, and ethanolamine.

8. The composition according to claim 3, wherein the coloring element is hydroxypyrene-trisulfonic acid.

9. The composition according to claim 4, wherein the acid used to neutralize in part the triethanolamine is hydrochloric acid.

10. The composition according to claim 2, wherein the coloring element is a tracer solvent having a fluorescent appearance under basic pH, wherein the pH of the composition lies in the range 8 to 9.

11. The composition according to claim 10, wherein the component having surface tension greater than 40 mN/m is triethanolamine, and wherein the composition further comprises an acid to neutralize in part the triethanolamine so as to obtain the basic pH.

12. The composition according to claim 2, further comprising a primary alcohol at a content in the range 1% to 20% by weight.

13. The composition according to claim 2, further comprising an acrylic resin in emulsion at a content of 2% to 15% by weight.

14. The composition according to claim 2, wherein the component having surface tension greater than 40 mN/m is selected from the group consisting of glycerin, sorbitol, glycols, and ethanolamine.

15. The composition according to claim 10, wherein the coloring element is hydroxypyrene-trisulfonic acid.

16. The composition according to claim 11, wherein the acid used to neutralize in part the triethanolamine is hydrochloric acid.

* * * * *